April 25, 1961  J. F. WINHOVEN  2,981,028
ARTIFICIAL FISH BAIT
Filed July 15, 1959
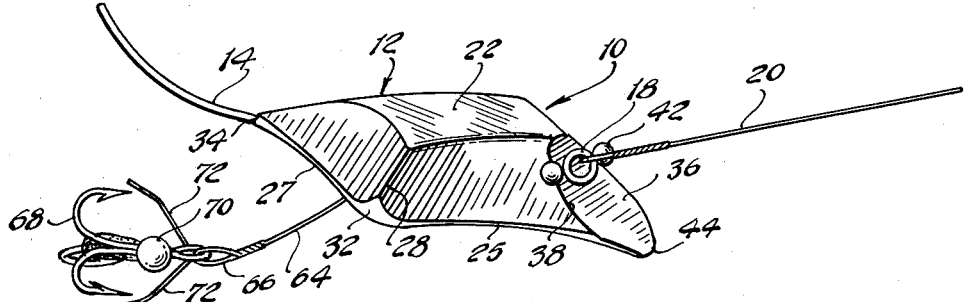
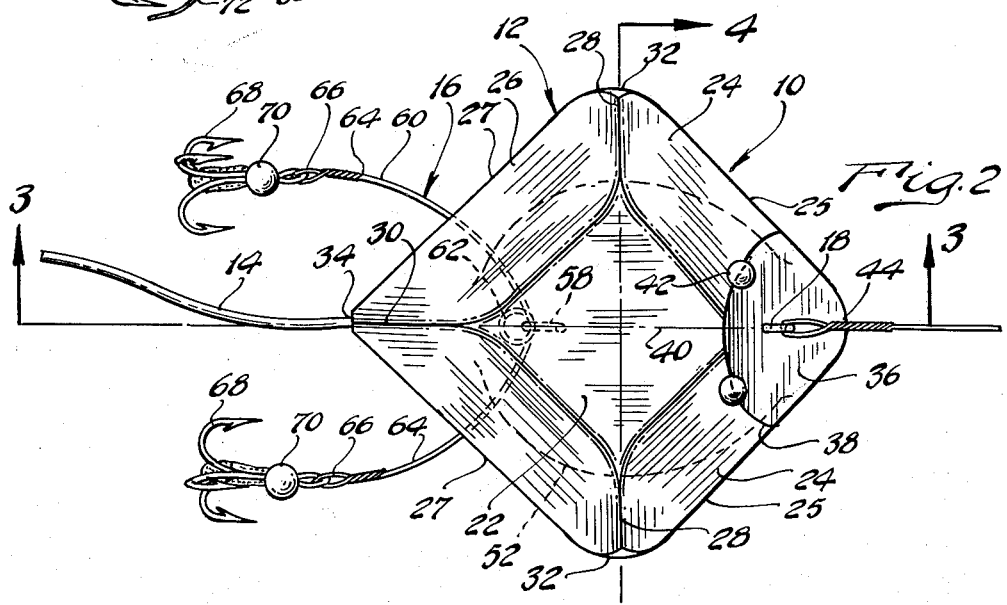
INVENTOR.
JOSEPH F. WINHOVEN
BY
Barthel + Bugbee
ATTORNEYS

United States Patent Office 2,981,028
Patented Apr. 25, 1961

2,981,028

ARTIFICIAL FISH BAIT

Joseph F. Winhoven, 31571 Lonnie Drive,
Garden City, Mich.

Filed July 15, 1959, Ser. No. 827,307

6 Claims. (Cl. 43—42.48)

This invention relates to fishing tackle and, in particular, to artificial fish baits or lures.

One object of this invention is to provide an artificial fish bait which is capable of attracting fish either when used as a surface bait floating on the surface of the water or as a subsurface bait drawn through the water beneath its surface, such as in trolling.

Another object is to provide an artificial fish bait which is adapted to be used in either casting or trolling and which, when cast, instantly rights itself if it lands on its back.

Another object is to provide an artificial fish bait of the foregoing character which, when the fishing line is jerked slowly while the bait is floating upon the surface, will perform a nose-diving action.

Another object is to provide an artificial fish bait of the foregoing character which, when drawn through the water, as in trolling or in retrieving a cast, wobbles sidewise while moving in a sinuous or undulatory path.

Another object is to provide an artificial fish bait of the foregoing character which is approximately diamond-shaped when viewed from above, and which has bevelled edges and a concave bottom surface, and preferably has a slightly concave nose portion, the combination of these features imparting the above-described actions or paths during operation or use.

Other objects and advantages of the invention will become apparent during the course of the following description of the accompanying drawings, wherein:

Figure 1 is a perspective view of an artificial fish bait according to one form of the invention, looking from a position slightly forward and to one side of the ball while it is being drawn through the water, as in trolling or retrieving a cast;

Figure 2 is a top plan view of the artificial fish bait shown in Figure 1, in trolling or cast-retrieving position;

Figure 3 is a longitudinal section taken along the line 3—3 in Figure 2; and

Figure 4 is a cross-section taken along the line 4—4 in Figure 2.

Referring to the drawing in detail, Figures 1 and 2 show an artificial fish bait, generally designated 10, according to one form of the invention as consisting generally of an approximately diamond-shaped body 12 of buoyant material such as wood or hollow synthetic plastic equipped with a flexible tail 14 and a trailing hook assembly 16. The body 12 at its forward end is provided with an eye 18 such as a screw eye, to which a conventional leader or fishing line 20 is connected, preferably with the use of a conventional swivel (not shown). The fishing line 20 is handled in any suitable conventional way, such as by connection to a reel on any suitable fishing rod (not shown) or held directly in the hand, as in trolling, according to the desire and preference of the user.

The fish bait body 12, as previously stated, is approximately diamond-shaped (Figure 2) with a generally diamond-shaped top or upper central surface 22 and inclined or bevelled forward and rearward edge surfaces 24 and 26 respectively terminating in relatively sharp forward and rearward edges 25 and 27 respectively. The forward and rearward inclined edge surfaces 24 and 26 intersect one another in ridge lines 28 and the rearward edge surfaces 26 intersect one another in a ridge line 30. The ridge lines 28 terminate in rounded side corners 32, the ridge line 30 in a somewhat sharper rearward corner 34. The forward inclined edge surfaces 24, in contrast, do not intersect one another since the forward end of the bait body 12 is gouged out or concaved as at 36 to provide a bevelled concave nose portion 37 having a roughly circular or arcuate boundary line 38 with the side and top surfaces 24 and 22 respectively. The eye 18 is mounted approximately in the center line 40 of the body 12 within the concave nose portion 36 slightly below the junction of the boundary line 38 with the upper surface 22. Ornamental eyes 42 are optionally inserted adjacent the nose portion 36, such as in the vicinity of the boundary line 38 on opposite sides of the center line 40.

From Figure 3 it will be noted that the concave nose portion 36 extends downwardly to a rounded forward corner 44 which is below the level of the rearward corner 34 relatively to the top or upper surface 22. The tail 14 is preferably of a flexible cord or rubber material and is cemented or otherwise secured within a bore 46 extending forwardly into the body 12 from the rearward corner 34. The body 12 has an approximately flat bottom surface 48 which, however, occupies only triangular areas near the side corners 32 and rear corner 34. The central portion of the bottom of the body 12 is occupied by a concave recess 50 (Figures 3 and 4) which extends upward from its roughly circular junction line 52 (Figure 2) with the bottom surface 48 and with the bottom surface forward extension 54 lying beneath the nose portion 37 near the forward corner 44. The extension 54 is of approximately cylindrical configuration, in that it is concave when viewed in longitudinal section (Figure 3) but flat in a lateral direction (Figure 4). The extension surface 54 has an arcuate junction or boundary line 56 with the concave surface of the recess 50.

Located near the rearward corner of the upper surface 22 of the bait body 12 and seated in the concave recess 50 is an eye 58, such as a screw eye, to which the trailing hook assembly 16 is pivotally connected. The trailing hook assembly 16 consists of an outrigger 60 of approximately V-shaped or U-shaped form with a central loop 62 engaging the eye 58 and with lateral arms 64 diverging rearwardly therefrom. The rearward ends of the arms 64 terminates in loops 66 to which the eyes of triple hooks 68 are connected. Weights 70 of lead or other suitable material are provided on the triple-pronged hook 68 for the purpose of causing the trailing hook assembly 16 to assume a vertical position when the bait 10 is at rest upon the surface of the water, but to assume a nearly horizontal position (Figure 1) when the bait is being drawn through the water. Weed-deflecting arms 72 of wire or the like may be provided to prevent the hooks 68 from being fouled by weeds, yet which yield laterally inward when a fish strikes at either of the hooks 68.

In the use of the invention, the fisherman may either employ the artificial fish bait 10 in casting or in trolling. In casting the bait 10, the fisherman employs the same technique as in casting other artificial fish baits of the plug type, so as to drop the bait 10 upon the surface of the water at a desired point. If the bait 10 lands upside down, so that the recess 50 and bottom surface 48 are facing upward, the weights 70 on the hook assembly 16 pull the bait body 12 into a right-side-up position.

When the bait 10 is at rest upon the surface of the water, the hook assembly 16 hangs vertically from the eye 58 because of the action of gravity upon the weights 70 and the pivotal connection 62 of the outrigger 60 to the eye 58.

Assuming that the bait 10 has been properly cast and has landed right-side-up or has been turned right-side-up in the manner just described above, the fisherman reels in the line 20 to retrieve the cast in the usual way. If while reeling in the line or while allowing the bait 10 to float on the surface of the water he jerks the line 20 by swinging the tip of his rod backwards, the nose portion 37 causes the bait 10 to nose-dive, returning to the surface when the jerk is terminated. When the bait first lands on the surface of the water, it can acquire an air bubble in the concave recess 50 beneath it. If, upon diving, the air bubble is discharged from the recess 50, the fisherman can create and insert another air bubble by tipping his fishing rod as he maneuvers the bait. The bait 10 then comes to the surface of the water and picks up another charge of air. The inclined forward nose surface 36 causes the diving action, which is facilitated by the relative thinness of the extension portion 54 adjacent the front corner 44. This diving action is also assisted by the inclined or bevelled edge surfaces 24 at the front half of the bait body 12.

As the fisherman retrieves the bait 10 by reeling in his line 20 after casting the bait 10, the bait 10 travels in an undulating or sinuous path, darting from side to side with a fast zigzag motion like a live minnow. As the bait is drawn through the water, the outrigger arms 64 and hooks 68 of the trailing hook assembly 16 move upward toward a more nearly horizontal position, and waggle horizontally back and forth. The concave recess 50 on the bottom 48 of the bait body 12 apparently participates in imparting a sidewise motion or "sidewinding" action to the bait. The bait 10 can be used either with a casting rod in the ordinary manner or with a spinning reel, or it can be cast with a flyrod. The diamond-shaped form with the bevelled edges also appears to cooperate with the other features of construction, such as the concave nose portion 37, concave bottom recess 50 and inclined side edges 24 and 26 in producing the zigzag and diving motions of the fish bait 10 of the present invention.

In the use of the artificial fish bait 10 of the present invention, in slow trolling, the bait 10 dives and darts to and fro, in a manner similar to the motion obtained in retrieving the bait 10 after a cast, as described above. As the trolling speed is increased, the fish bait 10 dives to a greater depth, and wobbles sidewise while moving in a roughly sinuous path. At the same time, the trailing hook assembly also swings from side to side around the pivot eyes 58 and loop 62 as a center. In general, the faster the trolling speed of the bait 10, the deeper the level below the surface at which it will travel.

What I claim is:

1. An artificial fish bait comprising a bait body of approximately diamond-shaped form having forward, rearward and lateral corners and top and bottom surfaces, a line attachment element secured to said body near said forward corner, a hook holder connected to said body rearwardly of said line attachment element, and a fish hook connected to said hook holder, said body having a concave recess in said bottom surface.

2. An artificial fish bait comprising a bait body of approximately diamond-shaped form having forward, rearward and lateral corners and top and bottom surfaces, a line attachment element secured to said body near said forward corner, a hook holder connected to said body rearwardly of said line attachment element, and a fish hook connected to said hook holder, said body adjacent said forward corner having a nose portion with a downwardly and forwardly inclined nose surface.

3. An artificial fish bait, according to claim 2, wherein said nose surface is concave.

4. An artificial fish bait, according to claim 2, wherein said nose portion has an extension thereof projecting downwardly and forwardly below the level of said lateral and rearward corners.

5. An artificial fish bait comprising a bait body of approximately diamond-shaped form having forward, rearward and lateral corners and top and bottom surfaces, a line attachment element secured to said body near said forward corner, a hook holder connected to said body rearwardly of said line attachment element, and a fish hook connected to said hook holder, said top surface being approximately flat and said bottom surface having a concave recess therein.

6. An artificial fish bait comprising a bait body of approximately diamond-shaped form having forward, rearward and lateral corners and top and bottom surfaces, a line attachment element secured to said body near said forward corner, a hook holder connected to said body rearwardly of said line attachment element, and a fish hook connected to said hook holder, said hook holder being connected to said body on said bottom surface, said bottom surface having a concave recess therein and said hook holder being connected to said bottom surface within said recess.

References Cited in the file of this patent

UNITED STATES PATENTS

| | | |
|---|---|---|
| D. 172,904 | Redman | Aug. 24, 1954 |
| 2,380,328 | Pecher | July 10, 1945 |